United States Patent
Chon et al.

(10) Patent No.: US 8,185,168 B2
(45) Date of Patent: May 22, 2012

(54) HANDSET WITH DOCKING HEADSET

(75) Inventors: Alex Chon, Carson, CA (US); Ki-Tae Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1240 days.

(21) Appl. No.: 11/421,315

(22) Filed: May 31, 2006

(65) Prior Publication Data

US 2007/0281660 A1 Dec. 6, 2007

(51) Int. Cl.
*H04W 4/00* (2009.01)
(52) U.S. Cl. .............. 455/575.2; 381/388; D14/223; D14/205
(58) Field of Classification Search .......... 455/575.2; 381/312, 328, 329, 388; D14/205, 223
See application file for complete search history.

(56) References Cited

U.S. PATENT DOCUMENTS

| | | | |
|---|---|---|---|
| 2002/0118825 A1* | 8/2002 | Mitra | 379/430 |
| 2003/0096640 A1 | 5/2003 | Bae | |
| 2004/0242264 A1 | 12/2004 | Cho | |
| 2006/0068857 A1* | 3/2006 | Asseily | 455/575.2 |
| 2006/0166715 A1* | 7/2006 | Van Engelen et al. | 455/575.2 |
| 2007/0025581 A1* | 2/2007 | Bradford et al. | 381/388 |
| 2007/0149261 A1* | 6/2007 | Huddart | 455/575.2 |
| 2007/0276523 A1* | 11/2007 | Alley | 700/94 |

* cited by examiner

*Primary Examiner* — Pierre-Louis Desir

(57) ABSTRACT

A system is provided that includes a base unit that is operable to transmit data wirelessly. The system includes two or more headsets each operable for wireless communication. At least one of the headsets is operable for wirelessly communicating with the base unit. The headsets are coupleable to the base unit for storage and charging.

20 Claims, 4 Drawing Sheets

HANDSET WITH DOCKING HEADSET

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION;

The present disclosure relates to handheld electronic devices. More specifically, but not by way of limitation, a system is described that provides for wireless communication between a handheld electronic device and one or more headsets and allows the headsets to be stored in and recharged by the handheld electronic device.

BACKGROUND OF THE INVENTION

Handheld electronic devices can include mobile telephones, personal digital assistants (PDAs), handheld computers, laptop computers, or similar devices that might be able to communicate wirelessly with a telecommunications network and/or with the Internet. Other handheld electronic devices could include portable media players, such as music players and video players. Combinations of such devices, such as mobile telephone/PDA combinations and mobile telephone/music player combinations are also available.

Many such devices, such as mobile telephones and portable music players, can produce an audio output and might consist of a handset portion that sends digital audio information wirelessly to a headset portion. For example, a mobile telephone might include a base handset that can communicate with a telecommunications network and an earpiece that can send and receive voice-related information wirelessly to and from the handset. The handset portion of such a handheld wireless device will be referred to herein as a base or a base unit. The earpiece portion will be referred to herein as a headset.

Transmission of digital audio information between a base and a headset might occur via the Bluetooth wireless communication protocol or a similar technology. For example, a mobile telephone user with a Bluetooth-enabled base and a Bluetooth-enabled headset could carry on a hands-free, wireless telephone conversation. The headset converts Bluetooth signals received wirelessly from the base into speech audible to the user and converts the users speech into Bluetooth signals that are transmitted wirelessly to the base. The base may be worn on a belt, placed in a pocket, or otherwise be maintained some distance from the headset. A user might be able to answer a phone call by pushing a button on the headset and might not need to have direct access to the base to answer the call. The communication protocol between the base and the headset wilt be referred to herein as Bluetooth, but it should be understood that other technologies, whether currently in existence or developed in the future, could be used to achieve similar results and should be considered within the scope of the present disclosure.

SUMMARY OF THE INVENTION

In one embodiment, a system is provided that includes a base unit that is operable to transmit data wirelessly. The system includes two or more headsets each operable for wireless communication. At least one of the headsets is operable for wirelessly communicating with the base unit. The headsets are coupleable to the base unit for storage and charging.

In another embodiment, a method for wirelessly providing audio information is provided. The method includes uncoupling a first and second headsets from a base unit. The method includes attaching the first and second headset to a user's ears. The method also includes transmitting the audio information wirelessly from the base unit to at least one of the first and second headsets.

In another embodiment, a wireless handset is provided that includes a base unit that is operable to transmit data wirelessly. The base unit does not have an integrated speaker/receiver component. The wireless handset also includes a headset that is operable to communicate wirelessly with the base unit, the headset has a speaker/receiver.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Currently, a user of a device with a separate base unit and headset might carry the base unit and headset as separate pieces. The user might also carry a separate battery charger for each piece, one for the headset and one for the base unit or handset. Carrying four separate pieces (a base, a headset, and two chargers) can be burdensome and difficult to manage.

Any of the pieces can easily become misplaced, possibly rendering all four pieces inoperable.

In embodiments of the present disclosure, a base unit or mobile handset device that can communicate wirelessly with one or more headsets is provided with an opening into which a headset can dock. The handset is configured or shaped to receive the headset for storage. In one embodiment, the size and shape of the opening are substantially the same as the size and shape of the headset so that the headset fits snugly in the opening and does not protrude outside the base unit. The base can thus retain the same general form regardless of whether the headset is attached while providing a convenient storage and carrying place for the headset that can prevent the headset from becoming lost. Storing the headset in this manner can also prevent the headset from becoming caught on clothing, seat belts, or other potential snares and further reduce the likelihood of the headset becoming dislodged or lost.

Embodiments of the present disclosure also allow the battery in the headset to receive an electrical charge from the base's battery while the headset is docked in the base. Since the battery in a base unit tends to be larger, and thus have a longer life, than the battery in a headset, the base unit battery can recharge the headset battery without significantly draining the base unit battery. Recharging the headset battery in this manner is more convenient than previous charging methods since the need for carrying a separate headset battery charger is eliminated. The possibility of losing a separate headset battery charger is also eliminated. When two headsets are used with a single base unit, one headset can be charged while the other is in use.

Figure 1C:
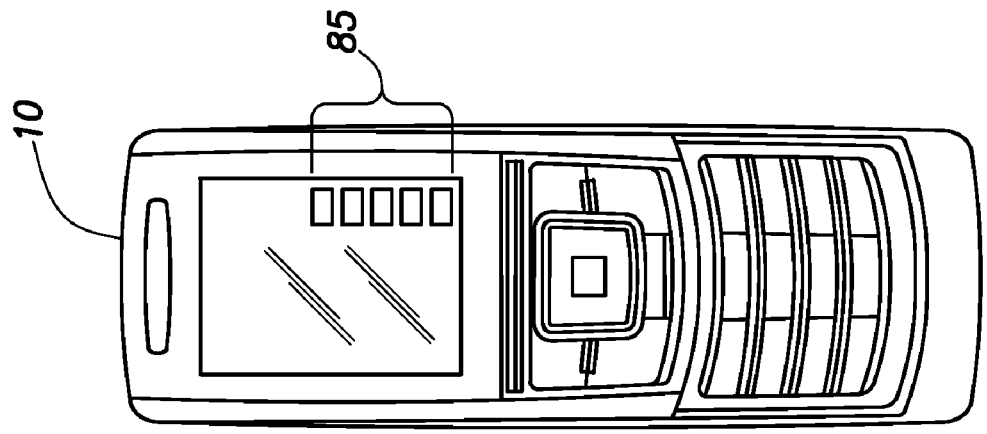
FIGS. 1a, 1b, and 1c illustrate a base unit with a single headset shown docked according to an embodiment of the present disclosure.
Figure 1B:
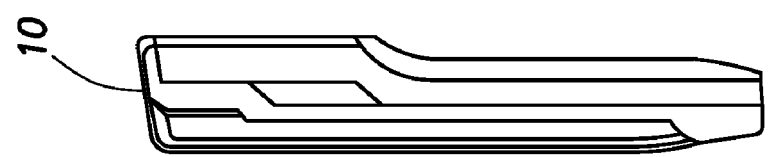
Figure 1A:
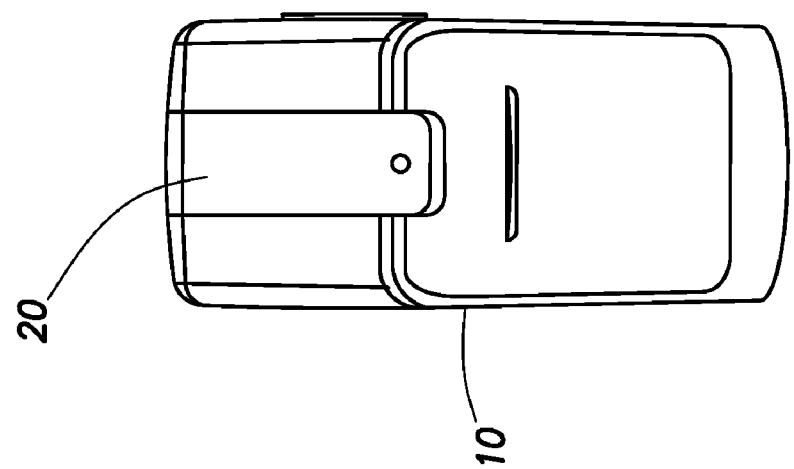

FIGS. 1a, 1b, and 1c illustrate back, side, and front views, respectively, of a base 10, or mobile handset device, into which a headset 20 can dock. In this embodiment, one headset 20 is docked into the center, upper portion of the rear of the base 10. Since the headset 20 is small and fits tightly in an opening in the base 10, the shape and size of the base 10 do not significantly change when the headset 20 is attached. When docked, the headset 20 is hidden and unobtrusive and may not be noticed by an observer who is unaware of its existence. The unobtrusive nature of the headset 20 is illustrated in the side view of FIG. 1b, in which the headset 20 cannot be seen. The ergonomic characteristics of the base 10 when the headset 20 is docked are not significantly different from the base's ergonomic characteristics when the headset 20 is not docked. A tab and slot, or some other retention mechanism well known to one of skill in the art, might be present on the base 10 and the headset 20 to hold the headset 20 securely in the base 10 and prevent the headset 20 from being dislodged.

In other embodiments, the headset 20 can be coupled, hung, or otherwise attached anywhere in or on the base 10 in other manners such that, when coupled to the base 10, the headset 20 is more or less obtrusive. For example, the headset 20 might slide completely into the base 10, might attach to the outside of the base 10, or might be coupled to the base 10 in other manners that will be apparent to one of skill in the art. The base 10 and the headset 20 might couple to one another directly or might couple indirectly through some other mechanical interface or component.

Figure 2:
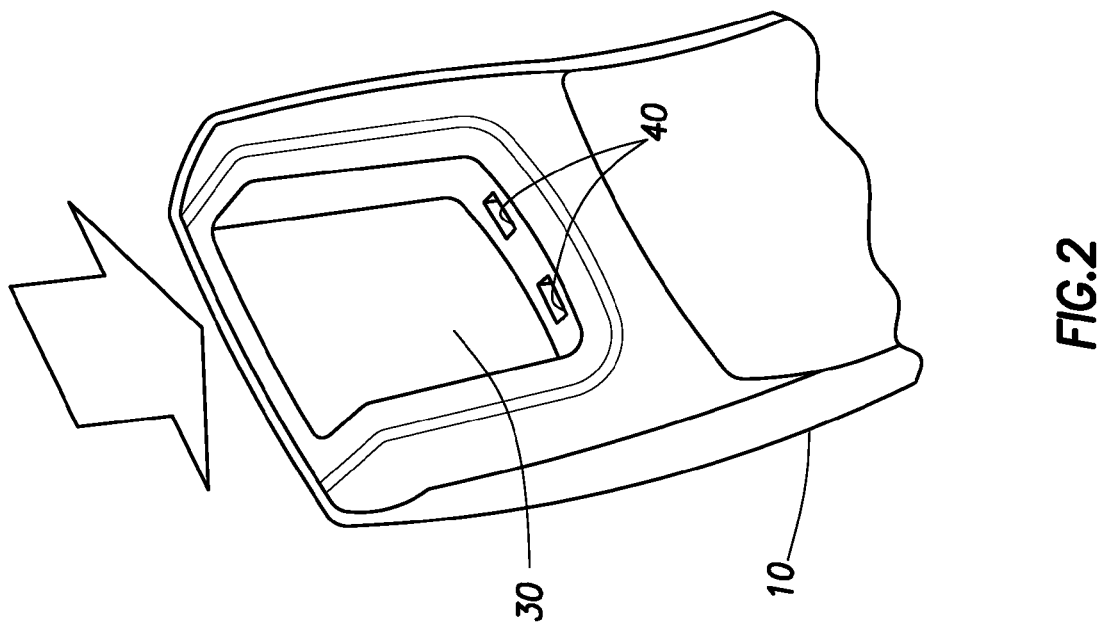
FIG. 2 illustrates a docking port on a base unit according to an embodiment of the present disclosure.

In an embodiment, the base 10 includes a charging connector into which the headset 20 can connect when the headset 20 is docked into the base 10. FIG. 2 illustrates a base 10 with an opening or docking port 30 in the center, upper portion of the rear of the base 10. Charging connectors 40 are present in the bottom portion of the docking port 30. When the headset 20 is inserted into the docking port 30, a charging connector on the headset 20 connects with one of the charging connectors 40 in the docking port 30. The battery in the base 10 can then charge the battery or other rechargeable component in the headset 20 via the charging connector 40. It is expected that charging the headset 20 from the base 10 will not significantly drain the charge on the base 10. In this way, the need for a user to carry a separate battery charger for the headset 20 can be eliminated.

FIG. 3 illustrates a headset 20 with a connector 50 on the bottom portion to match the location of the connectors 40 in the docking port 30 of the base unit 10. If the connectors 40 in the base unit 10 were in a different location in the docking port 30, the connector 50 on the headset 20 would be in a corresponding location to allow the two connectors 40 and 50 to meet when the headset 20 is in the docking port 30. The base connector 40 might be a male connector and the headset connector 50 might be a female connector or vice versa. In other embodiments, other types of connectors well known to one of skill in the art could be used. Also, in other embodiments, the base connector 40 and the headset connector 50 might couple by means of a cable 70 or some other intermediary connector. In such a case, the base connector 40 might be located outside the docking port 30.

Figure 4C:
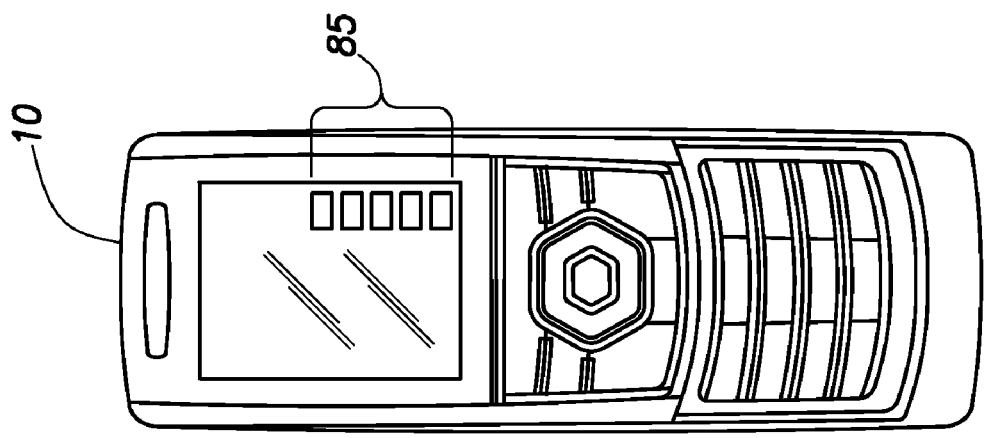
FIGS. 4a, 4b, and 4c illustrate an alternative base unit with dual headsets shown docked according to an embodiment of the present disclosure.
Figure 4B:
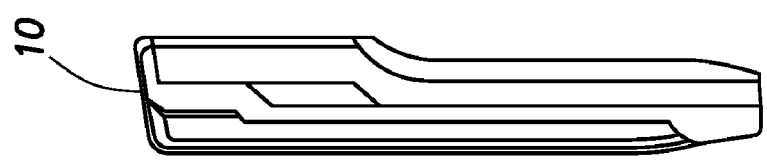
Figure 4A:
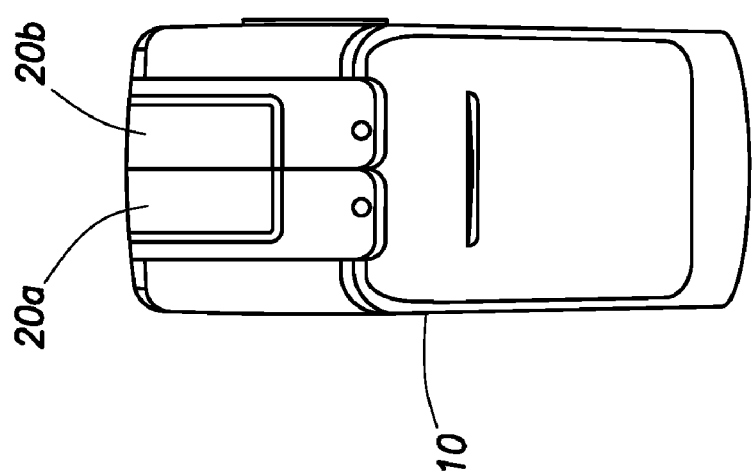

FIGS. 4a, 4b, and 4c illustrate back, side, and front views, respectively, of an embodiment in which two headsets 20 can dock into the base unit 10. As in the case of a single headset 20, the two headsets 20 are shown docking into the center, upper portion of the rear of the base 10 but could dock in other locations and in other manners. When the headsets 20 fit into the base 10 as shown in FIG. 4a, the headsets 20 are hidden and unobtrusive so that the headsets 20 do not significantly change the appearance of the base 10 when the headsets 20 are attached. The ergonomic characteristics of the base 10 again remain substantially the same whether the headsets 20 are docked or not docked. FIG. 4b further illustrates the unobtrusive nature and ergonomic design of the headsets 20.

In an embodiment, each headset 20 is independently recharged by the base 10 when docked with the base 10. That is, two base connectors 40 are present and each headset 20 can couple to one of the base connectors 40. In this way, two headsets 20 can be recharged simultaneously or one headset 20 can be recharged while the other is in use or is removed from the base connector 40 for some other reason. In an alternative embodiment, a single base connector 40 is present. A first headset 20a might couple to the single base connector 40 and a second headset 20b might couple to the first headset 20a. Each headset 20 might have a connector in its side or in another appropriate location to allow coupling to another headset 20.

Figure 3A:
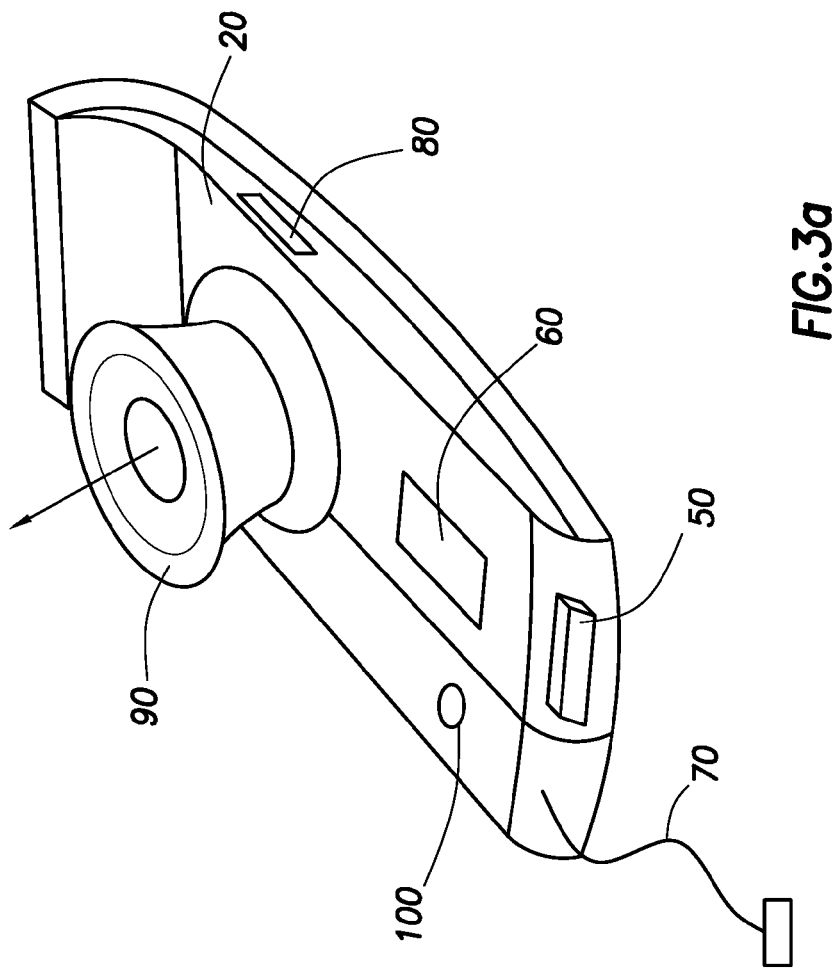
FIGS. 3a and 3b illustrate headsets according to embodiments of the present disclosure.
Figure 3B:
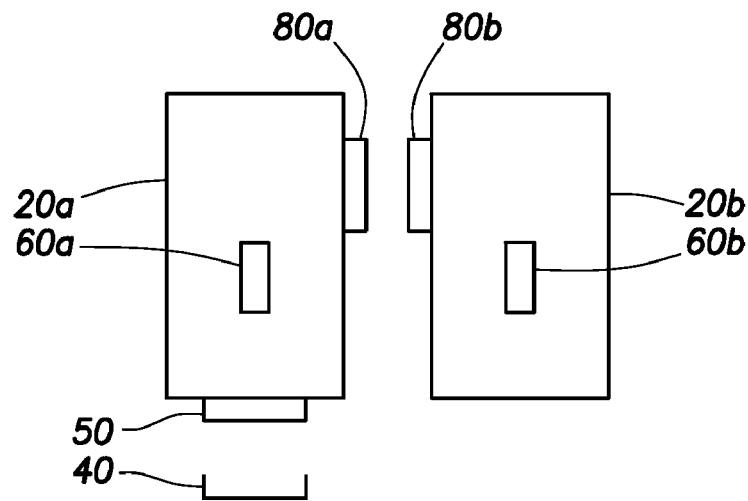

This is illustrated in FIG. 3b, where the first headset 20a includes the headset connector 50 that can couple to the base connector 40. The second headset 20b has a connector 80b that can couple to a connector 80a on the first headset 20a. The connectors 80 can be of various types well known to one of skill in the art and may or may not include a cable or some other intermediary connector. The headset connector 50 on the first headset 20a can couple to and receive a charge from the base connector 40, thus recharging a battery 60a or other rechargeable component in the headset 20a. The second headset 20b can then couple to and receive a charge from the first headset 20a via the connectors 80, thus recharging a battery 60b or other rechargeable component in the headset 20b.

Having two headsets 20 might be useful when the base 10 is, or contains, a digital music player, such as an MP3 player. Such a base 10 might send a Bluetooth transmission of music to each headset 20 and a user could listen to stereo music by inserting one headset 20 into each ear. A cable between the headsets 20 would not be necessary, in contrast with traditional stereo earphones where the earpieces are connected to each other or to a common cable.

When the base unit 10 is a mobile telephone, two headsets 20 might be used to extend the length of time over which an uninterrupted telephone conversation could be conducted using the base unit 10 or to extend the total time available for telephone conversations. The first headset 20a could be used to carry on a telephone conversation in the familiar manner. The second headset 20b could be placed in the base 10 and recharged while the first headset 20a is in use. As the battery 60a on the first headset 20a approached a fully discharged state, the second headset 20b could be removed from the base 10 and used to continue the telephone conversation or to carry on a subsequent conversation. The first headset 20a could then be placed in the base 10 for recharging. The headsets 20 could continue to be alternated in this manner so that a charged headset 20 would be available for as long as the base 10 was capable of charging the headsets 20. This can further reduce the need for a user to carry a separate battery charger for the headsets 20.

In an embodiment, the display screen on the base unit 10 includes a symbol or group of symbols 85 that indicate the charge level on the battery 60 in the headset 20. For example, a set of bars or similar shapes might be present on the screen and the number of bars that are highlighted might correspond to the charge level on the battery 60. When all of the bars are highlighted, a fully charged battery 60 might be indicated. Alternatively, one type of symbol 85 might appear while the battery 60 is charging and another type of symbol 85 might appear when the battery 60 is fully charged. In this way, the user can easily determine when a headset 20 is ready for use. The charge level display for the headset 20 might be located in a separate area of the screen from a charge level display for the base 10 or might be easily distinguishable from the charge level display for the base 10 in some other manner.

Returning to FIG. 3a, the headset 20 that might be used with the one-headset base 10 or the two-headset base 10 is illustrated. A portion of the headset 20 that produces an audible output and that can be inserted into or placed near a user's ear is known as an earbud 90. In this embodiment, the earbud 90 is collapsible. That is, the earbud 90 can be raised from and lowered to a surface of the headset 20. The earbud 90 can collapse toward the headset 20 to make the headset 20 smaller when the headset 20 is to be docked onto the base 10. When the headset 20 is to be used, the earbud 90 can extend away from the headset 20 for easier insertion into the user's ear canal.

In an embodiment, extension and collapse of the earbud 90 can activate or deactivate the headset 20. That is, pulling the earbud 90 out might turn the headset 20 on and pushing the earbud 90 in might turn the headset 20 off. Alternatively, a twisting motion might be applied to the earbud 90 during extension and collapse to turn the power on and off. Using the earbud 90 as a power switch in either of these manners can eliminate the need for a separate power button on the headset 20. In other embodiments, the earbud 90 and/or the power switch could have other configurations, the power switch may not be present, the earbud 90 may not be collapsible, or other variations apparent to one of skill in the art could be used.

It should also be understood that the headset 20 may not necessarily have the shape or configuration shown in FIG. 3a. Other shapes or configurations that are well known to or would be anticipated by one of skill in the art and that allow the headset 20 to mount or otherwise be maintained on or near a user's ear could be used.

Under the prior art, a base unit includes a speaker/receiver component that produces an output audible to the user. A user who does not have a headset or who is not using a headset can place a base unit near his or her ear and listen to a telephone conversation via the speaker/receiver on the base unit. In a current embodiment, the base 10 does not include a speaker/receiver as a permanently installed component. Instead, the user can dock the headset 20 into the base 10 and use the earbud 90 and/or other speaker/receiver system on the headset 20 as a base speaker/receiver. That is, when the headset 20 is docked, the user can listen to the earbud 90 on the headset 20 in the same manner as listening to a speaker/receiver that was manufactured integrally with a base unit. In this embodiment, the docking port 30 might be located on the base 10 such that, when the headset 20 is docked, the earbud 90 is near the user's ear.

Bluetooth data transmissions and similar data transmissions typically have a highly limited range. If the headset 20 moves out of the range of the base 10, data might not be successfully transmitted between the base 10 and the headset 20 and a telephone conversation could be cut off or difficult to understand. In an embodiment, the headset 20 is capable of providing a warning when the headset 20 has moved or is about to move out of the range of the base 10. The warning might be based on the strength of the signal received by the headset 20, on the distance of headset 20 from the base 10, or on some other parameter. The warning might be a beeping sound or some other type of audible and/or visible alert.

A user wearing the headset 20 might move some distance from the base 10 and forget where the base 10 is located. In an embodiment, the headset 20 is equipped with a means for locating the base 10. For example, the headset 20 might have a button or some other mechanism that, when activated, causes the base 10 to produce a beeping sound or some other type of audible and/or visible beacon. The user could trace the source of the beacon in order to determine the location of the base 10. Similarly, base 10 might be equipped with a means for locating the headset 20 so that the user could locate the headset 20 if it becomes misplaced.

Other features that are commonly available for wireless bases and headsets can be retained on the bases 10 and headsets 20 described herein. For example, a user could answer a telephone call by pushing a button 100 on, or otherwise manipulating, the headset 20 rather than by manipulating the base 10. Also, a user who is listening to music on the headset 20 when an incoming call is received can switch the headset 20 from the music mode to the telephone mode by manipulating the headset 20. Other wireless features that are well known to one of skill in the art could also be available on the present bases 10 and headsets 20.

The current embodiments allow a user to purchase the base unit 10 and the headset 20 as an integrated unit rather than buying a separate base and headset. The docking port 30 on the base 10 provides a convenient and secure storage location for the headset 20. This reduces the likelihood that the headset 20 will become lost or misplaced. The ability of the base 10 to recharge the headset 20 eliminates the need for a separate charger for the headset 20. This reduces the number of components that a user might need to carry and prevents the possibility of losing or misplacing a headset battery charger.

Figure 5:
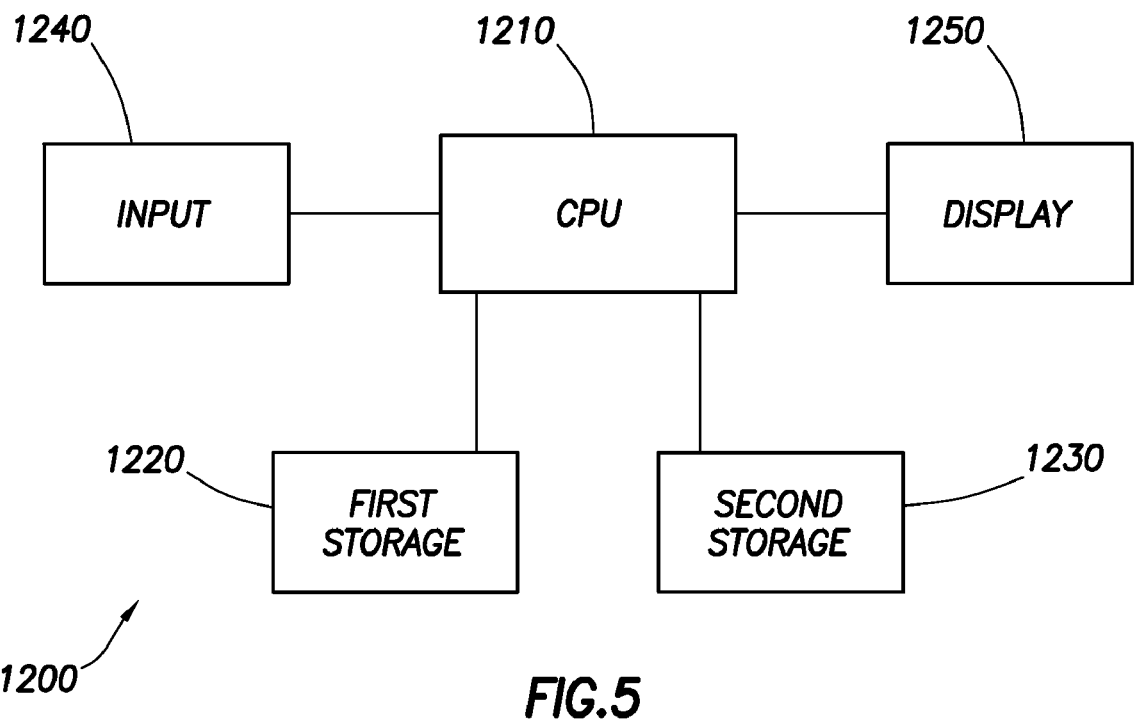
FIG. 5 illustrates a block diagram of a handheld wireless device operable for some of the various embodiments of the present disclosure.

The system described above may be implemented on a handheld electronic device such as is well known to those skilled in the art. An exemplary handheld electronic device 1200 for implementing one or more embodiments disclosed herein is illustrated in FIG. 5. The handheld electronic device 1200 includes a processor 1210 (which may be referred to as a central processor unit or CPU) that is coupled to a first storage area 1220, a second storage area 1230, an input device 1240 such as a keypad, and an output device such as a display screen 1250.

The processor 1210 may be implemented as one or more CPU chips and may execute instructions, codes, computer programs, or scripts that it accesses from the first storage area 1220 or the second storage area 1230. The first storage area 1220 might be a non-volatile memory such as flash memory. The second storage area 1230 might be firmware or a similar type of memory.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system comprising:
    a base unit operable to transmit data wirelessly; and
    two or more headsets each operable for wireless communication, each headset having a speaker and an audio receiver, at least one of the headsets operable to wirelessly communicate with the base unit, each headset configured to dock in an opening on a back side of the base unit for storage, wherein the two or more headsets are in direct contact with each other when docked in the opening,
    wherein the base unit includes a base unit connector and the headsets include a headset connector and wherein the base unit connector and the headset connector are operable to connect to one another when the headsets are coupled to the base unit and wherein the base unit provides an electrical charge to the headsets when the base unit connector and the headset connector are connected.

2. The system of claim 1, wherein a first of the headsets is operable to wirelessly communicate with a second of the headsets.

3. The system of claim 1, wherein the base unit is operable to charge the headsets.

4. The system of claim 1, wherein the base unit is selected from a group of base units consisting of a mobile telephone, a wireless handset, a personal digital assistant, a handheld computer, and a music player.

5. The system of claim 2, wherein the base unit is operable to charge the headsets.

6. The system of claim 1, wherein at least one headset includes an earbud collapsible for coupling to the base unit and operably expandable once removed from the base unit.

7. The system of claim 6, wherein the collapsing and expanding of the earbud activates and deactivates the at least one headset.

8. The system of claim 1, wherein a first headset is electrically coupled to a second headset and the first headset is configured to electrically recharge a rechargeable battery of the second headset.

9. The system of claim 1, wherein each of the headsets is operable for use by a user when every other headset is docked in the base unit.

10. The system of claim 1, wherein the base unit is further operable to electrically charge a rechargeable component of at least one of the headsets.

11. The system of claim 10, wherein the rechargeable component of the at least one headset comprises rechargeable batteries.

12. The system of claim 10, wherein at least one of the headsets and the base unit are coupleable via a cable to electrically recharge a rechargeable battery of the at least one headset.

13. A method for wirelessly providing audio information comprising:
    uncoupling a first headset of a plurality of headsets from an opening on a back side of a base unit, each headset having a speaker and an audio receiver, the opening configured to store the plurality of headsets, the plurality of headsets in direct contact with each other when docked in the opening;
    attaching the first headset to a user's ears;
    transmitting the audio information wirelessly from the base unit to the first headset; and
    connecting a base unit connector on the base unit to a headset connector on at least the first headset when the at least first headset is placed in an opening on the base unit, and electrically charging the headsets from the base unit when the base unit connector and the headset connector are connected.

14. The method of claim 13, further comprising:
    storing the plurality of headsets in the opening on the back side of the base unit; and
    charging the plurality of headsets being stored in the base unit.

15. The method of claim 13, wherein the base unit is selected from a group of base units consisting of a mobile telephone, a wireless handset, a personal digital assistant, a handheld computer, and a music player.

16. The method of claim 14, wherein the base unit is selected from a group of base units consisting of a mobile telephone, a wireless handset, a personal digital assistant, a handheld computer, and a music player.

17. A wireless handset comprising:
    a base unit operable to transmit data wirelessly, wherein the base unit does not have an integrated speaker/receiver component; and
    a plurality of headsets, each headset operable to communicate wirelessly with the base unit, each headset having a speaker and an audio receiver, each headset configured to dock in an opening on a back side of the base unit for storage, wherein the plurality of headsets are in direct contact with each other when docked in the opening,
    wherein the base unit includes a base unit connector and the headsets include a headset connector and wherein the base unit connector and the headset connector are operable to connect to one another when the headsets are coupled to the base unit and wherein the base unit provides an electrical charge to the headsets when the base unit connector and the headset connector are connected.

18. The wireless handset of claim 17, wherein each opening has a size and a shape substantially the same as the size and the shape of its respective headset and each headset is hidden from view in both a side view and a front view of the handset when docked in its respective opening.

19. The wireless handset of claim 17, wherein when a first of the headsets is docked with the base unit, the base unit uses a speaker/receiver on the first headset to produce audible sounds.

20. The wireless handset of claim 18, wherein the base unit is operable to charge the headsets.

* * * * *